United States Patent [19]

Vajs et al.

[11] Patent Number: 4,663,226
[45] Date of Patent: May 5, 1987

[54] FIRE RETARDANT

[75] Inventors: Lubomir Vajs, Toronto; Daniel M. Pettit, Bolton, both of Canada

[73] Assignees: Helena Vajs; Julie Marie Pettit, both of Toronto, Canada

[21] Appl. No.: 889,273

[22] Filed: Jul. 25, 1986

[51] Int. Cl.⁴ .................... B32B 1/04; B32B 3/02; B32B 3/26; B32B 7/02

[52] U.S. Cl. .................. 428/305.5; 252/606; 427/226; 427/373; 427/393.3; 427/421; 428/71; 428/76; 428/339; 428/921

[58] Field of Search ............. 252/606; 427/226, 373, 427/393.3, 421; 428/71, 76, 339, 305.5

[56] References Cited

U.S. PATENT DOCUMENTS

| | | | |
|---|---|---|---|
| 4,265,963 | 5/1981 | Matalon | 428/305.5 |
| 4,324,835 | 4/1982 | Keen | 428/305.5 |
| 4,529,467 | 7/1985 | Ward et al. | 428/921 |
| 4,530,877 | 7/1985 | Hadley | 428/921 |
| 4,572,862 | 2/1986 | Ellis | 428/921 |
| 4,588,523 | 5/1986 | Tashlick et al. | 428/921 |
| 4,594,368 | 6/1986 | Salyer et al. | 428/921 |

FOREIGN PATENT DOCUMENTS

| | | | |
|---|---|---|---|
| 96489 | 12/1983 | European Pat. Off. | 428/921 |
| 1598197 | 5/1978 | United Kingdom | 428/921 |
| 2052305 | 1/1981 | United Kingdom | 428/921 |
| 2130122 | 5/1984 | United Kingdom | 428/921 |

*Primary Examiner*—William J. Van Balen

[57] ABSTRACT

The present invention relates to coatings which provide fire resistance or fireproofing of an underlying product. In particular, the invention relates to a flexible coating which provides fire resistance by the formation of two stages of fire protection.

37 Claims, 4 Drawing Figures

FIRE RETARDANT

BACKGROUND OF THE INVENTION

Intumescent paint-type coatings for providing fire resistance or fire protection of an underlying product are well known and produce a foam-type cellular layer when exposed to temperature in excess of about 200° C. The produced foam layer insulates the underlying product and protects the same from direct contact with the flame. Intumescent paints are known for providing protection to products up to about 650° C., depending upon the intumescent used. At a temperature of about 650° C., the intumescent layer itself is consumed or starts to decompose whereby the protection to the underlying product is reduced or lost. In some cases, the structural characteristics of the underlying product change substantially with heat and fillers have been added to the intumescent coatings to provide additional structural rigidity. For example, if the product being protected cannot support the intumescent foam layer, then certain fillers may be added which when exposed to the elevated temperatures, react to strengthen the foam layer. The intumescent coatings bubble and foam when exposed to high temperatures to produce a multicellular insulation. This coating contains a source of carbon, a phosphorous releasing material which when exposed to higher temperatures decomposes to produce phosphoric acid, and a source of non-flammable gases which acts as a blowing agent.

In the case of high temperature protective coatings, vitrifying agents including silicon-type vitrifying materials have been used. However, the weight associated with a silicon vitrifying material used to protect an underlying product is quite high. Silicon-type materials may protect the underlying product, however, these layers tend to conduct heat readily and, therefore, are poor insulators.

Presently, there is a need to provide protection of foam urethane products commonly used as cushions in the manufacture of seats. In the airline industry, new standards have been adopted which require stringent fire resistant characteristics, and the problem is compounded in that a retrofit solution is preferable. Furthermore, weight considerations become important as well as the comfort of the treated seat. For example, there are available fire resistant fabrics in which the cushions could be wrapped, however, these tend to be fairly expensive and result in a uncomfortable seat as the natural resiliency and texture of the cushion is lost or reduced. A second solution to the airline seat cushion problem has been the use of new foam cushions which have fire resistant fillers therethroughout, however, this results in a substantial increase in the weight of the cushions as well as resulting in an expensive cushion. One such foam cushion contains silicon and is sold under the trade mark POLYVOLTAC.

SUMMARY OF THE PRESENT INVENTION

According to the present invention, a new flexible coating is taught which can be applied to rigid or flexible foam shapes or other materials and provide protection of the product up to a temperature in excess of 700° C. and preferably in excess of 1000° C. In some applications this high temperature protection (in excess of 1000° C.) may not be required and the coating is suitable for lower temperature applications. The coating relies on a two stage protection system, where the first stage produces an intumescent foam layer and the second stage relies on vitrification of an agent carried in the intumescent foam layer to lock the layer and provide protection to the layer and the product for higher temperatures. Therefore, the second stage is the combination of the intumescent layer which is locked or stabilized by the vitrifying agent such that the carbon of the intumescent foam is not consumed at high temperatures.

Although this coating has particular application for protecting combustible foam products, it is suitable for other products requiring fire protection such as wood products, structural supports, building products, clothing etc.

BRIEF DESCRIPTION OF THE DRAWINGS

Preferred embodiments of the invention are shown in the drawings wherein.

DETAILED DESCRIPTION OF THE PREFERRED EMBODIMENTS

Figure 3:
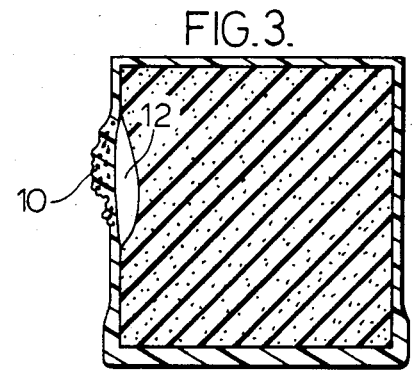
FIG. 3 is a view similar to FIG. 2 with a portion of the coating being exposed to the heat of combustion and resulting in a localized formation of an intumecent cellular foam layer.

The urethane foam block 2 shown in the drawings, has a protective coating 4 applied to the outer surface thereof which is of a thickness preferrably in the range of about 10 thousandths of an inch to 60 thousandths of an inch, and has good elastic properties whereby the characteristics of the foam with respect to comfort are retained. The coating includes a known intumescent material dispersed therethroughout which when exposed to heat experienced in combustion, produces a protective cellular layer generally shown as 10 in FIG. 3. A substantial amount of research has been done on intumescent materials of this type (carbon base, including a catalyst which produces phosphoric acid in combination with appropriate blowing agents), and they are normally employed in paints. The first stage of the protective coating therefore is this intumescent material reacting to provide the cellular foam layer in the same manner or at least in substantially the same manner as in known intumescent fire protective coatings. The second stage of protection is provided by a vitrifying agent, preferably a silicic base, which commences vitrification at a temperature substantially above the initial formation of the cellular foam layer. Vitrification of the vitrifying agent essentially locks the intumescent material in a cellular foam state and protects this cellular layer from decomposition to greatly increase the effective temperature range of the intumescent cellular foam layer. This second stage of protection is a combination of the insulating properties of the intumescent layer and the properties of the vitrifying agent which can be in a quantity substantially less than that required if the vitrifying agent was used alone. In some cases, the urethane foam block will collapse behind the intumescent foam layer 10 as generally at 12, due to melting of the urethane foam. The intumescent cellular foam layer will continue to protect the urethane foam block and the melted urethane from the flames and reduce heat transfer from the flame to the urethane foam.

As shown in the Figures, a reinforced tray-like portion 6 covers of the bottom of the foam block 2 and extends partially up the sides of the block with this layer 6 including non combustible reinforcing fibres such as glass fibres, generally indicated as 8 preferably randomly oriented and of a length of about 2 to 4 inches. As previously mentioned, in high temperature applications, the urethane foam block may be exposed to a temperature at which the urethane melts and the melted urethane collects near the bottom of the foam block. In some cases, the weight of the melted urethane would break through the vitrified intumescent foam layer 10 resulting in combustion of the urethane when exposed to the air and flame. The reinforcing region 6 provides additional strength to contain the melted urethane and generally acts as a tray. It has been found that the vitrified cellular foam layer 10 has sufficient strength to support itself, but does require reinforcing if there is a substantial melt of the urethane foam and protection of this melt is necessary.

Figure 4:
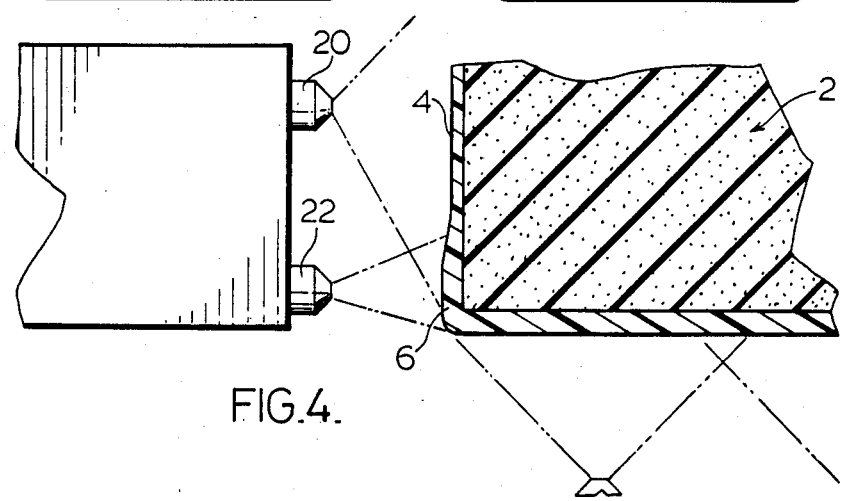
FIG. 4 is a side view of a block of urethane foam to which a coating is being sprayed.

One method of applying the protective coating 4 to the urethane foam block 2 is shown in FIG. 4, where two spray heads are shown as 20 and 22. Spray head 20 applies the flame proofing compound whereas head 22 applies the reinforcing fibers at the lower region of the foam block 2. In some case the water based elastomer is a silicon water based elastomer which at least forms part of the vitrifying agent. The spray heads preferably work in combination. A controlled amount of colour pigment is contained in the fire proofing compound such that the thickness of the coating can be approximated by the resulting colour of the coating and comprising the same with a predetermined colour standard. This provides a simple method for quality control.

The water based elastomer acts as a carrier for the intumescent and vitrifying agent. A silicone or neoprene water based elastomer as a carrier has a relatively high PH which will require a buffer to be used when ammonium polyphosphate is used. The buffer increases the PH of the combined buffer and ammonium polyphosphate sufficiently to avoid PH shock of the carrier.

Suitable vitrifying agents include silica powder or nepheline syenite powder or sodium tetraborate or hydrated magnesium silicate, or aluminum silicate or silicon resins, and silicone water based elastomers. Sodium tetraborate provides protection up to approximately 740° C. and, therefore, is a low temperature protection system. The silica powder can provide protection up to about 1500° C., whereas the hydrated magnesium silicate provides protection to about 1400° C. Nephaline syenite powder provides protection to about 1600° C. with aluminum silicate protecting up to 1800° C. and silicon resins protecting up to about 1500° C. Where a silicon water base elastomer is used, it will vitrify at approximately 575° C. and provide protection up to about 1400° C. Thus, the vitrifying agent increases the effective maximum temperature of the intumescent alone by at least 100° C. and in some cases more than doubles the prior maximum temperature.

Figure 1:
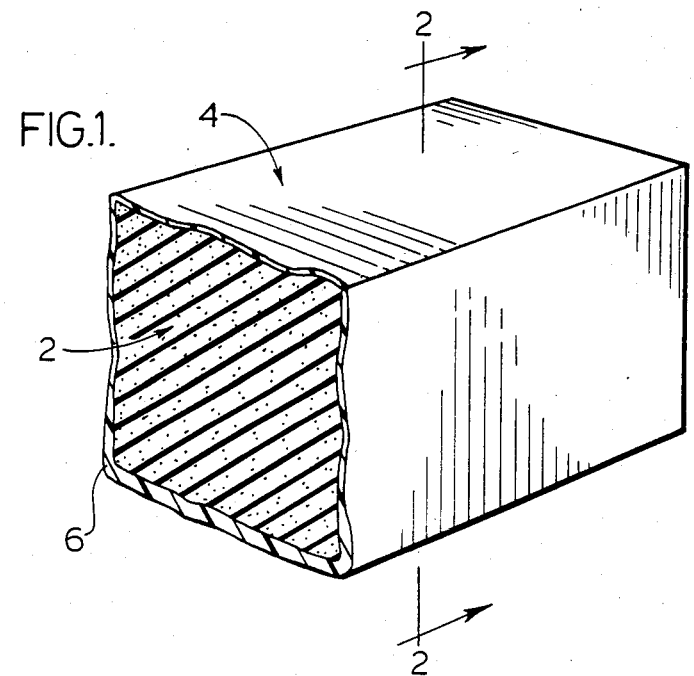
FIG. 1 is a perspective view of a cut away through a block of urethane foam to which the coating has been applied.
Figure 2:
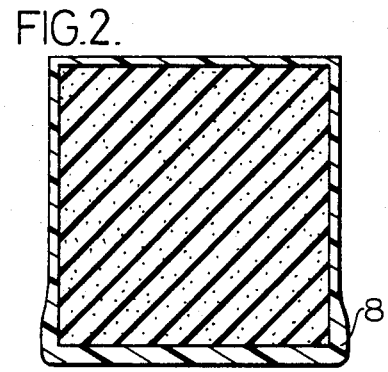
FIG. 2 is a cross section taken along line 2—2 of FIG. 1.

The coating 4 in FIG. 1 is relatively thin in the order of 10,000ths to 60,000ths of an inch and does not substantially alter the characteristics of the urethane foam with respect to compression and resiliency. This coating when exposed to high temperature heat produces a thick cellular foam layer where the density of the foam layer is less at the exterior and greater near the interior adjacent the material that it is to protect. The strength added to the intumescent foam layer due to the vitrifying agent also increases from the exterior of the foam to the interior of the foam. This occurs as the density of the vitrifying agent at the time of vitrification is greater adjacent the foam block 2.

It has been found a coating containing 17 to 40 parts by weight of ammonium polyphosphate, 17 to 27 parts by weight of pentaerythritol, 7 to 27 parts by weight of dicyandiamide, 45 to 75 parts by weight of water based elastomer preferably polychloroprene homopolymer and 5 to 50 parts by weight of a vitrifying agent preferrably 99.6 silica powder or nepheline syenite powder or sodium tetraborate or hydrated magnesium silicate or aluminum silicate or silicon resin, has proven acceptable. If sodium tetraborate is used, protection of the foam up to about 740° C. is obtained, whereas as silica powder provides protection to 1500° C., hydrated magnesium silica provides protection up to 1400° C., nepheline syenite powder provides protection up to about 1600° C., aluminum silicate protects up to 1800° C., and silicon resins protects up to 1500° C. One particularly suitable coating includes 21% diammonium phosphate, 13% pentaerythritol, 7% dicyandiamide, 10% vitrifying agent and 49% water based elastomer.

In the case of a silicon water based elastomer being used, it can include 17 to 40 parts by weight of ammonium polyphosphate, 17 to 27 parts by weight of pentaerythritol, 7 to 27 parts by weight dicyandiamide and 45 to 75 parts by weight of silicon water base elastomer. The silicon water based elastomer will vitrify at about 575° C. and the second stage will provide protection up to about 1400° C. One particularly suitable coating includes 26% ammonium polyphosphate, 17% pentaerythritol, 7% dicyandiamide and 50% silicon water based elastomer.

A further example includes 17 to 40 parts by weight diammonium phosphate, 17 to 27 parts by weight pentaerythritol, 7 to 27 parts by weight dicyandiamide, 45 to 75 parts by weight of water based elastomer, preferrably polychloroprene homopolymer, and 5 to 50 parts by weight of a vitrifying agent as discussed previously. Again a particularly suitable coating would include 21% diammonium phosphate, 13% pentaerythritol, 7% dicyandiamide, 10% vitrifying agent and 49% water based elastomer.

The above examples have not included the reinforcing with the fibreglass fibres, which are applied to the lower surface and about the edge of the foam block. The extent to which the bottom is reinforced will vary and the use of the glass fibres is as but one example of suitable reinforcing which is not limited thereby.

The coatings as described herein are capable of protecting rigid and or flexible foam shapes or other products, which unless protected would aggressively support combustion, and the application of this coating is not limited to protection of rigid and/or flexible foam shapes. The two stage coating resulting from the initial formation of an intumescent foam layer which is then locked or stabilized by a vitrifying agent disbursed therethroughout, with the vitrifying agent being of the type to provide protection for a substantially higher temperature range, provides advantages with respect to weight and ease of application of the coating to the product to be protected. Suitable methods of application include spraying, brushing, dipping and subsequent scrapping as but a few examples. This coating when appropriate vitrifying agents are selected, can protect the product to temperatures for at least a short duration in excess of 1000° C. and in some applications in excess of 1800° C. In the case of flexible foam seats for use in airlines, it is required to protect the product for at least two minutes when the foam block is exposed to a flame having an average temperature of about 1034° C. It is believed that when the coating is applied to the test block in a thickness of about 40 thousandths of an inch and the reinforcing layer has been applied about the bottom of the test block the coated product should meet the new standards set by the U.S. Federal Aviation Regulation Part 25, Appendix F, Part II.

This coating is easy to apply to the previously formed contoured airline seats, and does not appreciably increase the weight of the seats. The final weight of the coated seats of standard urethane foam is substantially less than the weight of the same seat when made of a non combustible foam, i.e. a foam which has been treated with a number of fillers which oppose the combustion of the foam block. This coating can be applied to existing cushions thereby allowing the retrofit of the huge number of airline seats which require protection under the new standard while still providing a satisfactory seat with respect to comfort.

It can be appreciated that although the coating has been described with respect to the retrofit of airline seats in particular, that it is not limited to this application and the coating is suitable for protecting many materials which would otherwise readily support combustion. For example, the rigid and/or flexible foam shapes used in furniture for institutional and home application, the foam cushions used in automobiles, building products such as wall boards, carpets, ceiling tiles, structural supports, mattresses or portions thereof for prisons, fire walls and doors are all appropriate. In addition, such seat cushions as used in theatres, hospitals, penitenaries, stadiums, meeting halls, recreational vehicles etc., could also advantageously use the present coating which does not substantially alter the performance of these seats while protecting these seats from combusion, for at least a limited time. Other applications no doubt, will be discovered as use of the coating becomes recognized, and the above examples do not restrict the invention.

Although various preferred embodiments of the present invention have been described herein in detail, it will be appreciated by those skilled in the art, that variations may be made thereto without departing from the spirit of the invention or the scope of the appended claims.

The embodiments of the invention in which an exclusive property or privilege is claimed are defined as follows:

1. A flexible coating applied to the surface of a product to provide a protective fireproof layer,
   said coating comprising;
   a base of an elastomeric material;
   a known carbon base intumescent material dispersed throughout the base which when exposed to heat of combustion foams and produces a protective cellular layer;
   and a vitrifying agent, dispersed throughout said coating which commences vitrification at a temperature substantially above the commencement of said cellular layer and prior to temperature decomposition of said foamed intumescent, said vitrifying agent stabilizing the carbon of said foamed intumescent when exposed to temperature which otherwise would cause decomposition of the cellular layer, said vitrifying agent increasing the effective maximum temperature of said intumescent foam layer by at least 100° C.

2. A coating as claimed in claim 1, wherein said coating is of a thickness less than about 0.060 of an inch.

3. A coating as claimed in claim 1, wherein said elastomeric base is a water based elastomer.

4. A coating as claimed in claim 3, wherein said product is of a flexible and/or rigid foam shape.

5. A coating as claimed in claim 4, wherein at least a portion of said coating is reinforced with glass fibers.

6. A coating as claimed in claim 1, capable of protecting said product for at least 2 minutes when exposed to a temperature of about 1000° C., as said vitrifying agent is of a silicic base.

7. A coating as claimed in claim 6, wherein said vitrifying material is selected from the group consisting of hydrated magnesium silicate, silica powder, silicon resins, and nepheline syenite.

8. A coating as claimed in claim 6, wherein said vitrifying material and said elastomeric material are combined by using a silicone water based elastomer.

9. A coating as claimed in claim 4, wherein said coating comprises by weight
   17 to 40 parts of diammonium phosphate,
   17 to 27 parts of pentaerythritol,
   7 to 27 parts of dicyandiamide,
   45 to 75 parts of water based elastomer, and
   5 to 50 parts of said vitrifying material.

10. A coating as claimed in claim 9, wherein said vitrifying material is selected from or a suitable mixture of, the following materials, silica powder nepheline syenite powder, sodium tetraborate, hydrated magnesium silicate, aluminium silicate and silicon resins.

11. A coating as claimed in claim 4, comprising;
    17 to 40 parts by weight of ammonium polyphosphate,
    17 to 27 parts by weight of pentaerythritol,
    7 to 27 parts by weight of dicyandiamide, and
    45 to 75 parts by weight of silicone water based elastomer.

12. A coating as claimed in claim 6 comprising;
    17 to 40 parts by weight of diammonium phosphate,
    17 to 27 parts by weight of pentaerythritol,
    7 to 27 parts by weight of dicyandiamide,
    45 to 75 parts by weight of water based elastomer,
    5 to 50 parts by weight of a silicate vitrifying agent.

13. A coating as claimed in claim 4, comprising;
    17 to 40 parts by weight of ammonium polyphosphate,
    17 to 27 parts by weight of pentaerythritol,
    7 to 27 parts by weight of dicyandiamide,
    45 to 75 parts by weight of water based elastomer, and
    5 to 50 parts by weight or vitrification agent selected from the group consisting of silica powder, nepheline syenite powder, sodium tetraborate, hydrated magnesium silicate, aluminium silicate and silicone resins.

14. A coating as claimed in claim 6 comprising;
    17 to 40 parts by weight of diammonium phosphate,
    17 to 27 parts by weight of pentaerithritol,
    7 to 27 parts by weight of disyandiamide,
    45 to 55 parts by weight of silicone water based elastomer.

15. A method of treating a preshaped rigid and/or flexible shape comprising;

applying a coating containing a base of elastomer material, a known carbon based intumescent foaming material dispersed throughout the base material, and a known vitrifying material suitable for a fire protection layer when vitrified, said vitrifying material being dispersed throughout the coating, said intumescent when exposed to a temperature of about 200° C. producing a cellular foam layer which provides a first stage of fire protection for the foam shape, said vitrifying material vitrifying after substantial formation of said cellular layer resulting in said layer and said vitrifying agent forming a stable insulating layer which protects said rigid and/or flexible foam shape to a temperature substantially greater than said foam layer alone;

said coating being applied to said form shape to at least essentially encapsulate the same while still retaining the resiliency of the foam shape.

16. A method as claimed in claim 15, wherein components of said coating are combined during application of said coating.

17. A method as claimed in claim 16, wherein said coating is sprayed on said cushion and said components are combined in the spray.

18. A method as claimed in claim 16, including applying reinforcing glass fibers to selected portions of said cushion which are retained in said coating.

19. A method as claimed in claim 16, wherein said coating is applied to achieve a thickness of at least about 0.010 of an inch.

20. A method as claimed in claim 16, wherein said coating is mixed with a colour pigment and the thickness of the coating is approximated by comparing the coating colour with predetermined colour standards.

21. A method as claimed in claim 16, wherein said vitrifying material starts to vitrify at about 600° C.

22. A coating applied to the surface of a low temperature combustible product to provide a fireproof protective layer capable of withstanding temperatures up to a predetermined minimum temperature, said coating comprising;

an intumescent material which when exposed to the heat of combustion produces a cellular foam layer which provides a first stage of fire protection of the product, and a vitrifying agent of the type recognized as providing fire protection which vitrifies after formation of the intumescent cellular foam layer and before decomposition of said layer to thereby protect both the intumescent cellular foam layer and the product from temperatures greater than said intumescent cellular foam layer alone could withstand;

said intumescent material and said vitrifying agent being combined in a suitable elastomeric base.

23. A coating as claimed in claim 22, wherein said coating is of a thickness less than about 0.060 of an inch.

24. A coating as claimed in claim 22, wherein said intumescent and said vitrifying agent are combined in a water based elastomer.

25. A coating as claimed in claim 24, wherein said product is of a rigid and/or flexible foam shape.

26. A coating as claimed in claim 25, wherein at least a portion of said coating is reinforced with glass fibers embedded in said coating.

27. A coating as claimed in claim 25, wherein said vitrifying agent is of a silicic base rendering the coating capable of protecting said product for at least 2 minutes when exposed to a temperature of about 1034° C.

28. A coating as claimed in claim 27, wherein said vitrifying material is selected from the group consisting of hydrated magnesium silicate, silica powder, silicon resins, and nepheline syenite.

29. A coating as claimed in claim 27, wherein said vitrifying material and said elastomeric material are combined by using a silicone water based elastomer.

30. A coating as claimed in claim 22, wherein said coating comprises by weight
17 to 40 parts of ammonium polyphosphate,
17 to 27 parts of pentaerythritol,
7 to 27 parts of dicyandiamide,
45 to 75 parts of water based elastomer, and
5 to 50 parts of said vitrifying material.

31. A coating as claimed in claim 30, wherein said vitrifying material is selected from or a suitable mixture of the following materials, silica powder, nepheline syenite powder, sodium tetraborate, hydrated magnesium silicate, aluminium silicate and silicon resins.

32. A coating as claimed in claim 27, comprising;
17 to 40 parts by weight of ammonium polyphosphate,
17 to 27 parts by weight of pentaerythritol,
7 to 27 parts by weight of dicyandiamide, and
45 to 75 parts by weight of silicone water base elastomer.

33. A coating as claimed in claim 27, comprising;
17 to 40 parts by weight of diammonium phosphate,
17 to 27 parts by weight of pentaerythritol,
7 to 27 parts by weight of dicyandiamide,
45 to 75 parts by weight of water based elastomer, and
5 to 50 parts by weight of a vitrifying agent.

34. A coating as claimed in claim 22, comprising;
17 to 40 parts by weight of ammonium polyphosphate,
17 to 27 parts by weight of pentaerythritol,
7 to 27 parts by weight of dicayndiamide,
45 to 75 parts by weight of water based elastomer,
5 to 50 parts by weight of vitrification agent selected from the group consisting of silica powder, nepheline syenite powder, sodium tetraborate, hydrated magnesium silicate, aluminium silicate and silicone resins.

35. A method of forming a two stage fire protective coating applied to a product comprising;
forming an initial intumescent cellular foam layer on a product when first exposed to heat in excess of about 200° C., and thereafter
vitrifying an agent throughout said foam layer at a temperature less than the temperature at which said layer decomposes, said agent stabilizing carbon of said intumescent to thereby protect a coated product at elevated temperatures at which the intumescent layer alone is not capable.

36. A fireproofing compound comprising:
a carrier of an elastomeric material;
a known carbon base intumescent material which when exposed to heat of combustion produces a protective cellular foam layer;
and a vitrifying agent which stabilizes the carbon of the intumescent when exposed to a temperature which would otherwise cause decomposition of the foamed intumescent, said vitrifying agent stabilizing the carbon of the intumescent by vitrifying and combining therewith.

37. A fireproofing compound as claimed in claim 36, wherein said carrier is of a water based neoprene or silicone and said compound includes a suitable buffer to avoid PH shock of the carrier when combined with the intumescent.

* * * * *